(12) United States Patent
Zichek et al.

(10) Patent No.: US 7,549,494 B1
(45) Date of Patent: Jun. 23, 2009

(54) TRANSVERSE MOUNTED MID-ENGINE THREE WHEEL VEHICLE

(76) Inventors: Daniel A. Zichek, 3725 S. 17th St., Lincoln, NE (US) 68502; David A. Zichek, 5141 S. 37th St., Lincoln, NE (US) 68516

( * ) Notice: Subject to any disclaimer, the term of this patent is extended or adjusted under 35 U.S.C. 154(b) by 549 days.

(21) Appl. No.: 11/389,965

(22) Filed: Mar. 27, 2006

Related U.S. Application Data

(60) Provisional application No. 60/668,180, filed on Apr. 2, 2005.

(51) Int. Cl.
*B62K 61/06* (2006.01)
(52) U.S. Cl. .................. 180/210; 180/311; 180/312
(58) Field of Classification Search ............... 180/210, 180/215, 311, 312
See application file for complete search history.

(56) References Cited

U.S. PATENT DOCUMENTS

| | | | |
|---|---|---|---|
| 2,782,864 A | 2/1957 | Fessia | 180/55 |
| 3,829,117 A | 8/1974 | Park | 280/96.1 |
| 4,405,027 A | 9/1983 | Enokimoto | 180/56 |
| 4,425,976 A | 1/1984 | Kimura | 180/56 |
| 4,429,760 A | 2/1984 | Koizumi | 180/215 |
| 4,529,055 A | 7/1985 | Gotoh et al. | 180/210 |
| 4,593,785 A | 6/1986 | Yamamoto | 180/291 |
| 4,821,827 A | 4/1989 | Reese | 180/61 |
| 5,433,285 A | 7/1995 | Richards | 180/215 |
| 6,631,925 B1 | 10/2003 | Lawson, Jr. | 280/781 |
| 6,976,554 B2 * | 12/2005 | Tsuruda | 180/291 |
| 7,249,648 B2 * | 7/2007 | Michisaka et al. | 180/219 |
| 7,311,167 B2 * | 12/2007 | Takayanagi et al. | 180/215 |
| 7,377,549 B2 * | 5/2008 | Hasegawa et al. | 280/770 |
| 2004/0178011 A1 * | 9/2004 | Lenkman | 180/210 |
| 2007/0045020 A1 * | 3/2007 | Martino | 180/210 |

* cited by examiner

*Primary Examiner*—Eric Culbreth
(74) *Attorney, Agent, or Firm*—James D. Welch

(57) ABSTRACT

A three wheeled vehicle, suitable for use at highway speeds, having at least one seat and independently suspended rear wheels, each being driven via a sequence of two constant velocity universal joints, there further being a transverse mounted multiple cylinder mid-engine and transmission substantially present between the seat and centers of the rear wheels.

8 Claims, 5 Drawing Sheets

TRANSVERSE MOUNTED MID-ENGINE THREE WHEEL VEHICLE

This Application Claims Benefit of Provisional Application Ser. No. 60/668,180 Filed Apr. 2, 2005.

TECHNICAL FILED

The present invention relates to motorized vehicles, and more particularly to a three-wheeled vehicle having two back wheels and a front wheel and one or more a seats thereinbetween, said three-wheeled vehicle presenting with a transverse multiple cylinder mid-engine and transmission mounted substantially between said seating and rear wheels, said three-wheeled vehicle further comprising independently suspended rear wheels, each of which is driven via a sequence of constant velocity universal joints, said three-wheeled vehicle being suitable for use at highway speeds.

BACKGROUND

It is known to construct wheeled motorized vehicles with more than two wheels. For instance, a Patent to Richards, U.S. Pat. No. 5,433,285 describes a three-wheeled Golf Cart which has a transversely mounted motor in line with the rear axle. Another U.S. Pat. No. 4,821,827 to Reese describes a Mid-engine mount for a Golf Cart. Said vehicles, however, are not capable of operation at, for instance, 75 MPH or greater. The present invention construction, on the other hand, is designed for use at highway speeds. Other known Patents are disclosed as they were found in a Patent Search are Nos. 6,631,925; 4,593,785; 4,529,055; 4,429,760; 4,425,976; 4,405,027; 3,829,117 and 2,782,846.

No known reference, however, describes a three-wheeled vehicle comprising:
  a frame;
  two back wheels and one front wheel;
  seating;
  first and second fuel tanks;
  a storage compartment;
  a transversely mounted engine and transmission;
  a transmission control means;
  first braking means for applying wheel rotation slowing force simultaneously to said two back wheels; and
  second braking means for applying wheel rotation slowing force to said front wheel;
  at least one headlight;
  at least one taillight;
  dual front and back turn signals; and
  a speedometer and other gauges;
that is suitable for operation at highway speeds.

Need remains for an improved three wheeled vehicle comprising a transverse multiple cylinder mid-engine and transmission mounted substantially between seating and rear wheels thereof, wherein said three-wheeled vehicle further comprises independently suspended rear wheels, each of which is driven via at least one constant velocity universal joint. The present invention provides such a vehicle.

DISCLOSURE OF THE INVENTION

The present invention is a three-wheeled vehicle comprising:
  a frame;
  two back wheels and one front wheel;
  seating;
  first and second fuel tanks;
  a storage compartment;
  a transversely mounted engine and transmission;
  a transmission control means;
  first braking means for applying wheel rotation slowing force simultaneously to said two back wheels; and
  second braking means for applying wheel rotation slowing force to said front wheel;
  at least one headlight;
  at least one taillight;
  dual front and back turn signals; and
  a speedometer and other gauges.

The seating can be appropriate for a driving rider, or can be appropriate to allow one or more passengers to ride therebehind. The frame can be elongated over that of a single rider vehicle to enable providing this capability.

The present invention also can comprise an aerodynamic body and windshield.

Said frame is of piped construction and presents with functionally located means for securing non-frame elements of said three-wheeled vehicle thereto. A preferred frame provides a nominal 64.5 inch real wheel base, and a nominal 105 inches between said front and back wheels. A suitable frame is described in detail in the Detailed Description Section of this Disclosure.

Each of said two back wheels is independently rotatably secured to said frame via pivotally mounted rear axles, said pivot mountings being centrally located and being oriented to allow motion in a vertical plane therearound. Said rear axles each are further interconnected to said frame by at least one spring and at least one shock absorber.

Said front wheel is rotatably mounted to said frame by way of a pivot or spring mounted means for allowing steering, said pivot means allowing rotation therearound. A preferred means for allowing steering and said rotatable mounting of said front wheel to said frame, comprises a spring loaded system, which can be either a telescoping-type with springs between telescoping elements thereof, or of a fixed length with springs mounted parallel thereto in a manner such that the vertically oriented front wheel motion is buffered thereby.

Said headlight(s) and dual front turn signals can be attached to said means for allowing steering such that they follow when said front wheel is caused to be steered, or attached to a body fairing so that it does not so move.

It is noted that said seating is mounted to said frame between said two back wheels and said front wheel, so that as viewed by a user sitting therein said headlight(s) and turn signals are aimed in a steering direction when the front wheel is caused to be steered. Further, said speedometer and other gauges can also affixed to said means for allowing steering in a location such that a user can easily observe while sitting in said seating, or they can be mounted to such as a fuel tank so that they do not so move.

Of major significance is that said transversely mounted multiple cylinder engine and transmission is solidly affixed to said frame at a mid-location between said seating and said independent rear axles, and said transmission control means is mounted to said frame in a location such that a user can easily operate it while sitting in said seating.

Also of importance is that each of said rear wheels is functionally interconnected to said transversely mounted engine and transmission by a drive shaft which comprises two constant velocity universal joints.

The first of said fuel tanks is affixed to said frame below said seating, and the second thereof is affixed to said frame between said seating and said means for allowing steering of said front wheel.

Said storage compartment is affixed to said frame at a location between said seating and said front wheel.

Said taillight(s) are mounted to the rear of the vehicle and the rear turn signals are mounted one to the left and one to the right of a centerline of said three-wheeled vehicle as viewed from in back of the rear wheels.

A preferred embodiment provides that first and second braking means are disc brakes, wherein said first braking means for applying wheel rotation slowing force simultaneously to said two back wheels, is operated by a foot pedal which is located between said front wheel and said seating at a location convenient for operation by a user's foot when said user is sitting in said seating. The second braking means for applying wheel rotation slowing force to said front wheel is preferably a hand operated lever means located on said means for allowing steering of said front wheel which is positioned at a location convenient for operation by a user's hand when said user is sitting in said seating. Further, said second braking means preferably comprises two disc brakes, one said disk brake being located on one side of said front wheel, and the other said disk brake being located on an opposed side of said front wheel.

Preferred first and second fuel tanks each have a nominal capacity of 5 gallon tanks.

Preferred practice is to combine said at least one spring and at least one shock absorber which mounts each said independent rear axle to said frame, to form MacPherson struts wherein the shock absorber is contained within said spring; however, it is within the scope of the present invention to utilize conventional Struts wherein the shock absorber is not contained within said spring.

A preferred present invention three-wheeled vehicle further comprises a windshield affixed to said means for allowing steering such than when said front wheel is caused to be steered, said windshield turns likewise; however, said windshield can be mounted to a non-moving fairing body element which does not so move.

The present invention will be better undersood by reference to the Detailed description Section of this Specification, in conjunction with the Drawings.

SUMMARY OF THE INVENTION

It is therefore a primary purpose and or objective of the present invention to provide a three-wheeled vehicle having two back wheels and a front wheel and seating thereinbetween, said three-wheeled vehicle presenting with a transverse mounted multiple cylinder mid-engine and transmission present substantially between said seating and rear wheel axles, said three-wheeled vehicle further comprising independently suspended rear wheels, each of which is driven via at least one constant velocity universal joint.

Other purposes and/or objectives of the present invention will become apparent upon a reading of the Specification and Claims.

DETAILED DESCRIPTION

To begin, a catalog of the frame elements suitable for constructing a present invention three-wheeled vehicle frame comprises:

VR1—Left Side Rear Vertical Support;
VR2—Right Side Rear Vertical Support;
VR3—Left Side Vertical Radiator Tie;
VR4—Right Side Vertical Radiator Tie;
LCA1—Left Side Lower Control Arm Flange;
LCA2—Right Side Lower Control Arm Flange;
GP1—Right Side Lower Gusset Plate;
GP2—Left Side Lower Gusset Plate;
GP3—Right Side Lower Gusset;
GP4—Left Side Lower Gusset;
GP5—Center Lower Goose Gusset;
GP6—Right Side Upper Goose Gusset;
GP7—Left Side Upper Goose Gusset;
G1—Head Tube;
G2—Right Side Goose Neck Connector;
G3—Left Side Goose Neck Connector;
G4—Left Side Goose Neck Lower Connector;
G5—Right Side Goose Neck Lower Connector;
G6—Lower Connector Tie;
F1—Left Side Front Lower Frame;
F2—Right Side Front Lower Frame;
F3—Front Lower Frame Tie;
F4—Rear Lower Frame Tie;
C1—Right Side Center Seat Support;
C2—Left Side Center Seat Support;
C3—Seat Support Tie;
C4—Right Side Vertical Seat Support;
C5—Left Side Vertical Seat Support;
C6—Horizontal Seat Support;
C7—Left Side Front to Aft Seat Support;
C8—Right Side Front to Aft Seat Support;
C9—Left Side Lower Frame Tie;
C10—Right Side Lower Frame Tie;
RT1—Left Side Rear Frame Top;
RT2—Right Side Rear Frame Top;
RT3—Left Side Rear Frame Extension;
RT4—Right Side Rear Frame Extension;
RT5—Top Rear Frame Tie;
RT6—Left Side Radiator Extension;
RT7—Radiator Tie;
RT8—Right Side Radiator Extension;
RB1—Left Side Rear Frame;
RB2—Right Side Rear Frame;
RB3—Lower Frame Tie;
RB4—Left Side Lower Radiator Extension;
RB5—Right Side Lower Radiator Extension;
RB6—Lower Radiator Tie.

For clarity, it is noted that the terminology "Right and Left" as applied to describe the present invention three-wheeled vehicle refers to the Right and left of a rider present therein, or as it is viewed from the back.

Figure 1A:
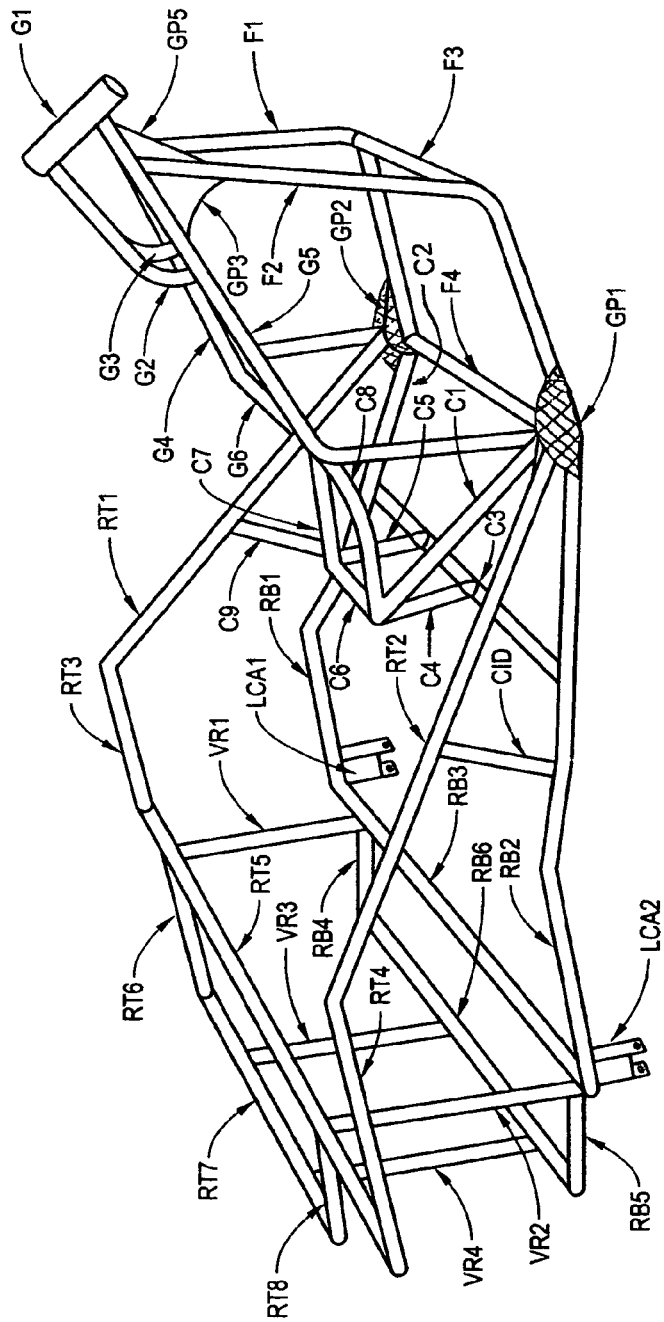
FIG. 1a shows a frame suitable for constructing the present invention three-wheeled vehicle as viewed from the right.

Continuing, as shown by FIG. 1a, a frame provided by interconnecting the identified cataloged elements results in, as viewed in perspective with the rear end of said frame positioned to the left and the forward end thereof positioned to the right, comprises major elements:

left side (RT3) and right side (RT4) rear frame extension elements which each project substantially horizontally parallel to one another;

left side (RT1) and right side (RT2) rear frame top elements which each project downward and centrally;

said left side (RT3) rear frame extension element and said left side (RT1) rear frame top element being continuous;

said right side (RT4) rear frame extension element and said right side (RT2) rear frame top element being continuous.

The ends of said rearward left side (RT3) and right side (RT4) rear frame extension elements are interconnected by a top rear tie element (RT5), and said forward ends of said left side (RT1) and right side (RT2) rear frame top elements being interconnected by a lower frame tie (F4).

Said frame further comprises left side (RB1) and right side (RB2) rear frame lower elements which project horizontally parallel to said left side (RT3) and right side (RT4) rear frame extension elements therebeneath, and then downward and centrally to connections with left side (RT1) and right side (RT2) rear frame top elements, respectively.

The rearward ends of left side (RB1) and right side (RB2) rear frame lower elements are interconnected by a lower frame tie (RB3), and the forward ends of left side (RB1) and right side (RB2) rear frame lower elements being interconnected by a lower frame tie (F4), there being an additional seating support tie (C3) interconnecting said left side (RB1) and right side (RB2) rear frame lower elements between said lower frame tie (RB3) and said lower frame tie (F4);

there being a left side lower control arm flange (LCA1) and a right side lower control arm flange (LCA2) affixed to project downward from, respectively, the rearward ends of said left side (RB1) and right side (RB2) rear frame lower elements.

Said left side (RT1) rear frame top element are interconnected to said left side (RB1) rear frame lower element by a left (C9) lower frame tie;

and right side (RT2) rear frame top elements and right side (RB2) rear frame lower element by a right (C10) lower frame tie.

Said top rear tie element (RT5) being interconnected to lower frame tie (RB3) by substantially vertically projecting left (VR1) and right (VR2) rear vertical supports.

Left (RB4) and right (RB5) lower radiator extensions project rearward and are connected to said substantially vertically projecting left (VR1) and right (VR2) rear vertical supports, with the latter connecting to lower frame tie (RB3) respectively.

Rearward aspects of left (RB4) and right (RB5) lower radiator extensions are interconnected by lower radiator tie (RB6).

Upper left (RT6) and right (RT8) radiator extensions are connected to said top rear tie element (RT5) and projecting rearward and are interconnected by upper radiator tie (RT7);

while said lower radiator tie (RB6) and said upper radiator tie (RT7) being interconnected by substantially vertically projecting left (VR3) and right (VR4) vertical radiator ties.

Said frame further comprises left (F1) and right (F2) lower front frame elements which connect to said left (RB1) and right (RB2) rear frame lower elements and project forward and first gradually upward and second substantially upward, and centrally toward one another; and left (G4) and right (G5) lower head tube elements which also connect to said left (RB1) and right (RB2) rear frame lower elements and project forward and upward and converge to a common connection therebetween.

Said left (F1) and right (F2) lower front frame elements are interconnected by lower frame tie element (F3) at the location where the gradual upward projection becomes a more substantially upward projection;

said left (F1) and right (F2) lower front frame elements being forwardly connected to said left (G4) and right (G5) lower head tube elements, respectively.

There is a head tube (G1) connected, at a lower end thereof, to said left (G4) and right (G5) lower head tube elements at their point of interconnection, said head tube (G1) being connected to left (G3) and right (G2) head tube connectors at an upper end thereof, said left (G3) and right (G2) head tube connectors projecting generally downward to interconnections with left (G4) and right (G5) lower head tube elements, respectively.

Said frame further comprises left (C2) and right (C1) center seating supports which project centrally, rearward and upward from interconnections to said left side (RT1) and right side (RT2) rear frame top elements;

said left (C2) and right (C1) center seating supports being rearwardly interconnected by horizontal set support (C6);

said left (C2) and right (C1) center seating supports being interconnected to seating support tie (C3) by substantially vertically projecting left (C5) and right (C4), respectively;

there being left (C7) and right (C8) fore to aft seating supports which project forward and gradually upward to interconnect to left (G4) and right (G5) lower head tube elements, respectively, with an upper (G6) connector tie being present between said left (C7) and right (C8) fore to aft seating supports.

Said frame further comprises a lower left (GP2) gusset which interconnects convergent ends of left side (RT1) rear frame top element, left (C2) center seating support, left (G4) lower goose neck element, left (F1) lower front frame element, and lower frame tie (F4);

left side (RT1) rear frame top element, left (C2) center seating support, left (G4) lower head tube element, left (F1) lower front frame element, and lower frame tie (F4);

and lower right gusset (GP1) which interconnects convergent ends of right side (RT2) rear frame top element, right (C1) center seating support, right (G5) lower head tube element, right (F2) lower front frame element, and lower frame tie (F4).

Said frame further comprises central lower gusset (GP5), lower left (GP4) and lower right (GP3) gussets which interconnect:
  right (F2) lower front frame element and lower frame tie element (F3),
  left (F1) lower front frame element and lower left head tube element (G4), and
  right (F2) lower front frame element and right lower head tube element (G5), respectively.

And said frame further comprises upper left geese (GP7) and upper right (GP6) geese gussets which interconnect:
  left (G3) head tube connector and lower left head tube (G4) element, and
  right (G2) head tube connector and right lower goose head tube (G5), respectively.

It is noted that the radiator can be placed other than being functionally connected to said lower radiator tie (RB6) and said upper radiator tie (RT7) and vertically projecting left (VR3) and right (VR4) vertical radiator ties. Further, the area identified in the frame behind the shown Radiator (RAD), (see FIG. 4), can be adapted for use as additional storage space.

Figure 1B:
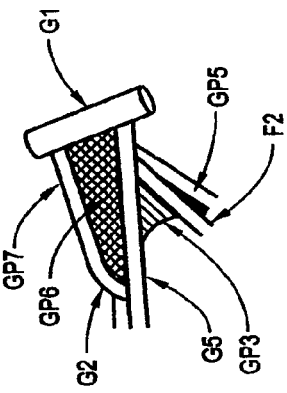
FIGS. 1b and 1c show strength enhancing gusseting
Figure 1C:
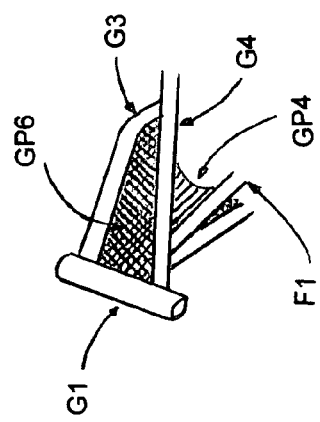

FIG. 1b is included to show that a preferred embodiment also includes strength enhancing gussetting between elements G2 and G5 and between G5 and F2. Likewise similar gussetting is placed between G3 and G4 and between G4 and F1 as shown in FIG. 1c.

Figure 2:
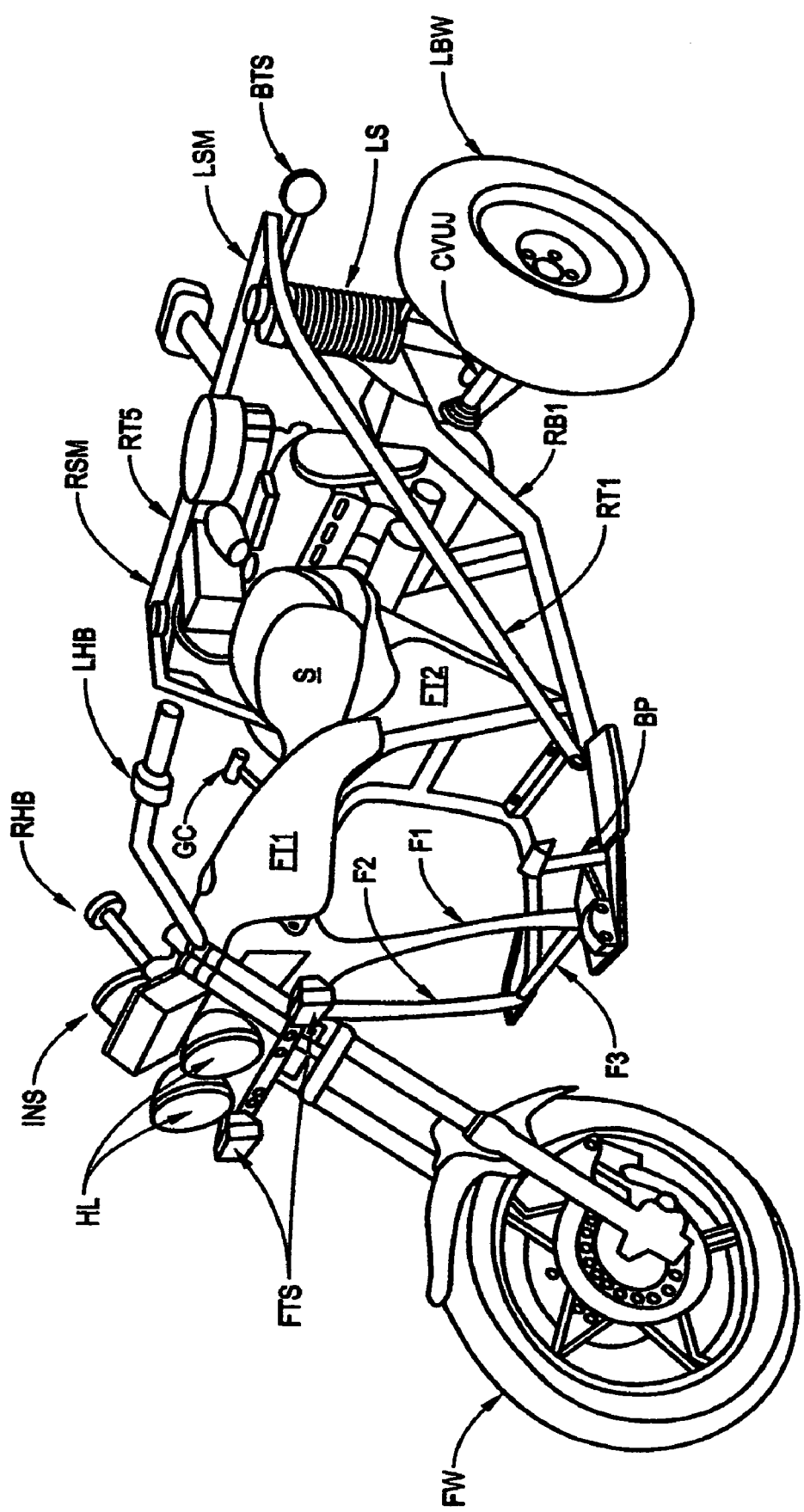
FIG. 2 shows the present invention three-wheeled vehicle in perspective as viewed from the left.
Figure 3:
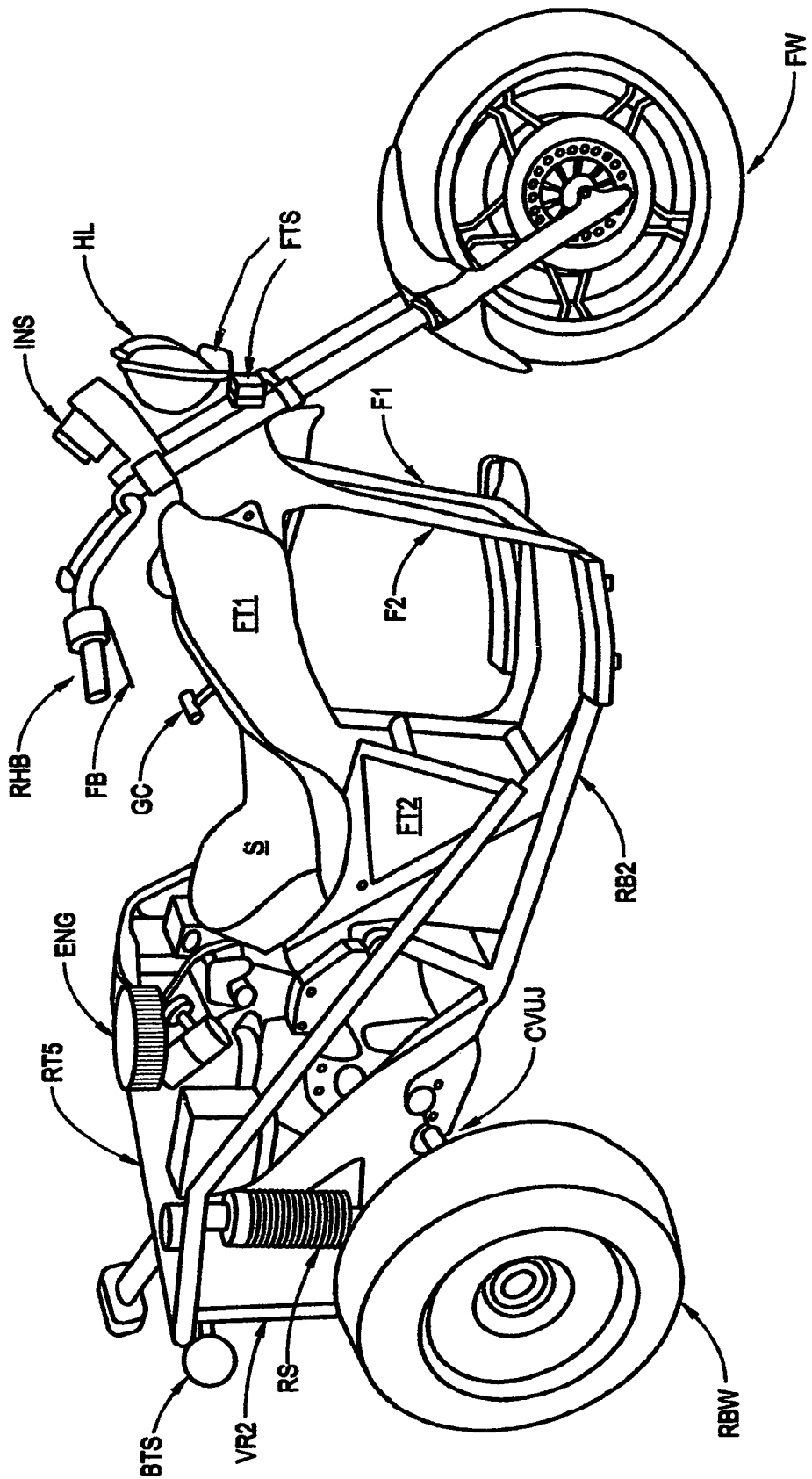
FIG. 3 shows the present invention three-wheeled vehicle in perspective as viewed from the right.
Figure 4:
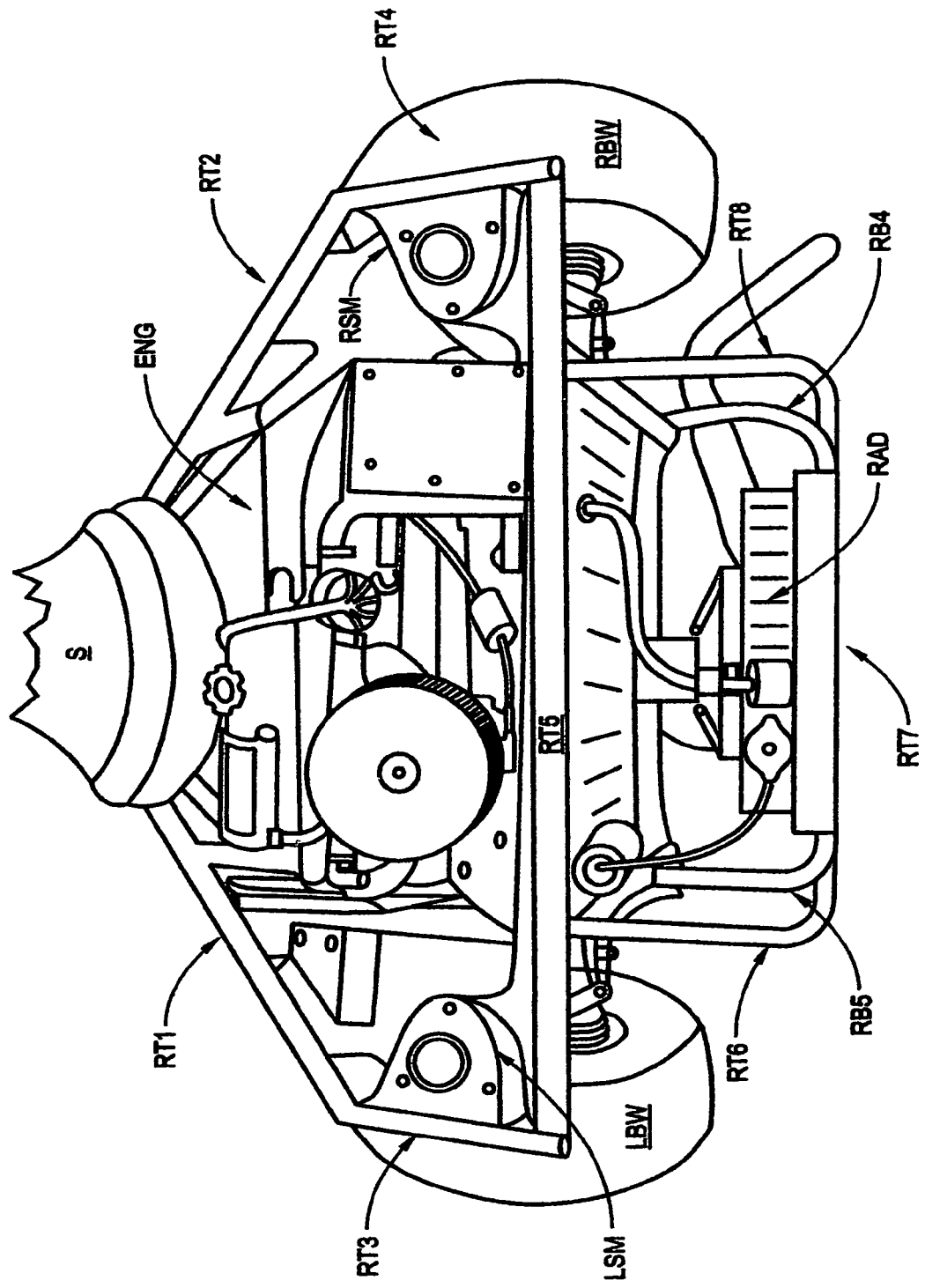
FIG. 4 shows the present invention three-wheeled vehicle as viewed from the back and above.
Figure 5:
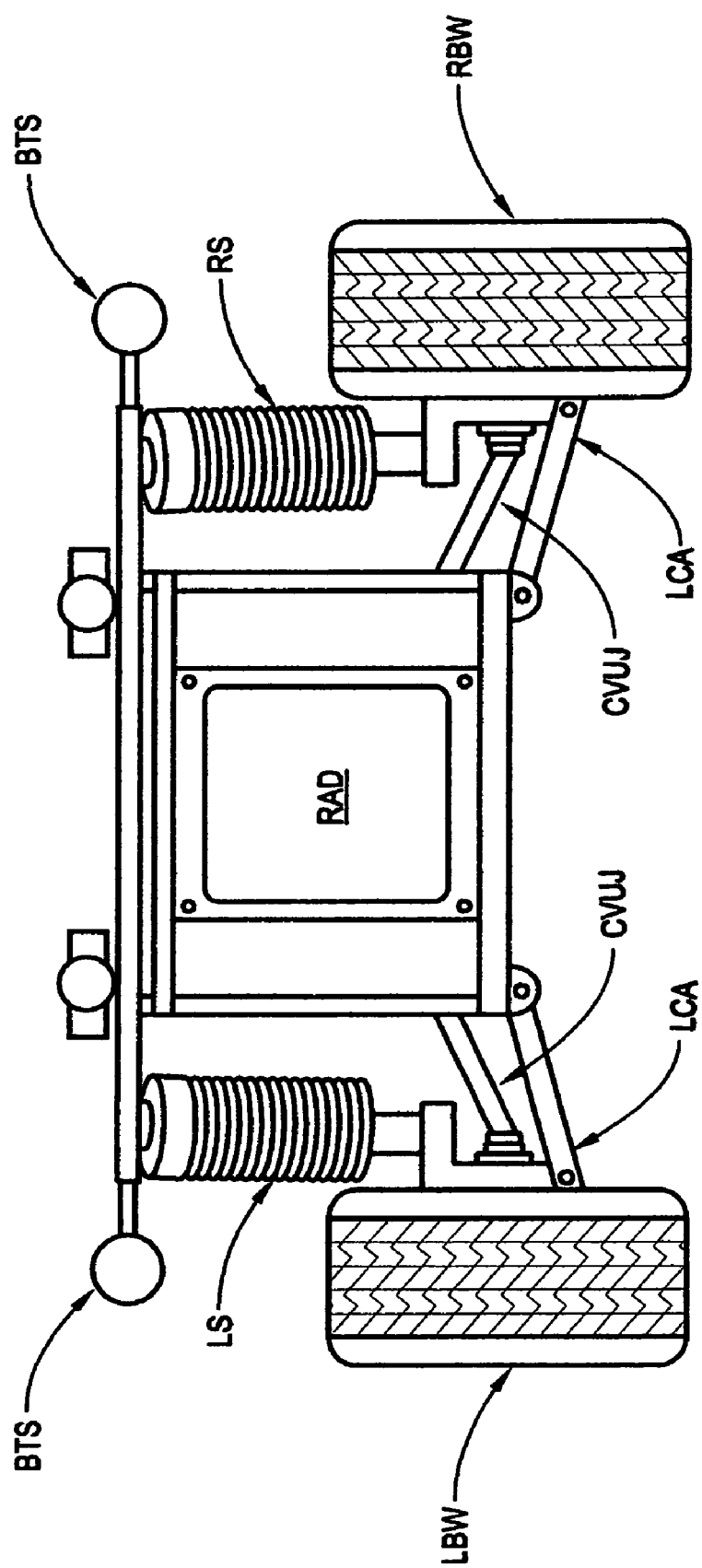
FIG. 5 shows the present invention three-wheeled vehicle as viewed in elevation from the back.

With a suitable Frame described, attention is now turned to FIGS. 2, 3 and 4 which show a constructed present invention three-wheeled vehicle. Briefly, FIG. 2 shows the present invention three-wheeled vehicle in perspective as viewed from the left side, FIG. 3 shows the present invention three-wheeled vehicle in perspective as viewed from the right side, FIG. 4 shows the present invention three-wheeled vehicle as viewed from the back, and above and FIG. 5 provides a back elevational view. It is also noted that an alternative non-telescoping spring mounted Front Wheel Assembly can be substituted for a Front Wheel Assembly which mounts via projection through Head Tube (G1) as shown, and remain within the scope of the present invention.

Continuing, in more detail, FIGS. 2 and 3 show the frame of FIG. 1a with many of the identifiers used to describe said FIG. 1a indicated for reference. FIGS. 2 and 3 show a Front Wheel (FW) attached via a Handle Bar (RHB) (LHB) system that typically affixes to the Frame via a projection through the FIG. 1 Head Tube (G1). Further an Engine (ENG) is generally indicated as present between a Seat (S) and the Top Rear Tie Element (RT5). Note that said Seat (S) sits above an the location whereat an Auxiliary Fuel Tank, indicated by (FT2), can be positioned and which is in back of Main Fuel Tank (FT1). Said Engine (ENG) provides drive to Right and Left Rear Wheels (RBW) and (LBW), each via at least one Constant Velocity Universal Joint (CVUJ). Preferred practice provides that a sequence of two Constant Velocity Universal Joints (CVUJ) be present between the drive from the engine and each Wheel ((RBW) and (LBW). Note that Struts (RS) and (LS) serve to functionally span between Wheel axles and Right (RSM) and Left (LSM) Strut Mounts that affix to the FIG. 1 Left Side (RT3) and Right Side (RT4) Rear Frame Extension Elements. Importantly, FIGS. 2 and 3 show that the Present Invention vehicle comprises a Transverse Mounted Multiple Cylinder Mid-Engine and Transmission mounted between said Seat (S) and the Rear Wheels (RBW) and (LBW), each of which is independently suspended via Right (RS) and Left (LS) Struts, and each of which is driven via at least one, and preferably a sequence of two, Constant Velocity Universal Joints (CVUJ).

Continuing, FIGS. 2 and 3 also show a Gear Shift Control (GC) and a First Braking Means comprising a Rear Wheel Brake Pedal (BP) conveniently positioned for use by a rider who is sitting in the Seat (S) via his or her right hand and left foot respectively. A Second Braking Means comprising a Front Wheel Brake Control (FB) is preferably also present on a Handle Bar, seen as on the Right (RHB) in FIG. 3, and Headlights (HL), Front (FTS) and Back (BTS) Turn Signals and an Instrument Panel (INS) are also indicated. Further, it should be appreciated that a Storage Area is provided in the Present Invention Vehicle under the First Fuel Tank (FT1), and between (F1) and (F2) to the front and (C4) and (C6) to the rear. Note that the Gear Shift Control (GC) and Rear Wheel Brake Pedal (BP) can be otherwise positioned for easy access by, for instance, amputees, and the Front Wheel Brake Control (FB) can be placed on the opposite handlebar Left Handle Bar (LHB).

FIG. 4 serves to further indicate the location of the Engine (ENG) with respect to the Right (RBW) and Left (LBW) Rear Wheels and Seat (S). FIG. 4 further shows the presence of a Radiation (RAD) behind Top Rear Tie Element (RT5) and affixed to the Upper Radiator Tie (RT7), and provides a better view of how the Right (RSM) and Left (LSM) Strut Mounts affix to the FIG. 1 Left Side (RT3) and Right Side (RT4) Rear Frame Extension Elements. And, it is noted that the region between the Engine (ENG) and the Radiator (RAD) can be fashioned into a second storage area, perhaps accompanied by moving the Radiator (RAD). Radiator (RAD can be fashioned into a second storage area, perhaps accompanied by moving the Radiator (RAD).

FIG. 5 shows the present invention three-wheeled vehicle as viewed in elevation from the back to better show the relationship between the Radiator (RAD) the Left (LS) and Right (RS) Struts, and the Constant Velocity Universal Joints (CVUJ) which project from Engine Drive Providing Means to each of the Right (RBW) and Left (LBW) Back Wheels. Also indicated are Lover Control Arms (LCA).

Finally, it is noted that the Engine (ENG) used in the prototype is a four cylinder overhead cam; however, any multiple cylinder mid-mounted engine can be used. Further, the language "said three-wheeled vehicle presenting with a transverse multiple cylinder mid-engine and transmission mounted substantially between said seating and rear wheel centers", is to be read to not necessarily include a radiator and interconnecting apparatus, which can be outside the boundaries set by said seat and rear wheel centers, (i.e. centers of the rear wheel axles), or absent as in air cooled engines.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A three-wheeled vehicle comprising:
    a frame;
    two back wheels and one front wheel;
    seating;
    first and second fuel tanks;
    a storage compartment;
    a transversely mounted multiple cylinder engine and transmission;
    a transmission control means;
    first braking means for applying wheel rotation slowing force simultaneously to said two back wheels; and
    second braking means for applying wheel rotation slowing force to said front wheel;
    at least one headlight;
    at least one taillight;
    dual front and back turn signals; and
    an instrument panel;
    said frame comprising functionally located means for securing non-frame elements of said three-wheeled vehicle thereto;
    each of said two back wheels being independently rotatably secured to said frame via pivotally mounted rear axles thereby allowing motion in a vertical direction therearound, said rear axles each being further interconnected to said frame by struts;
    said front wheel being rotatably mounted to said frame by way of a pivot means for allowing steering;
    said seating being mounted to said frame between said two back wheels and said front wheel;
    said at least one headlight and dual front turn signals being attached thereto such that a selection from the group:

when said front wheel is caused to be steered said dual headlights and turn signals are directed in the direction the front wheel is caused to assume;

when said front wheel is caused to be steered said dual headlights and turn signals are not directed in the direction the front wheel is caused to assume;

applies;

said instrument panel being affixed in a location such that a user can easily observe them while sitting in said seating;

said transversely mounted multiple cylinder engine and transmission being solidly affixed to said frame via said means for securing non-frame elements of said three-wheeled vehicle thereto, at a mid-location between said seating and said independent rear axles, said transmission control means being mounted to said frame in a location such that a user can easily operate it while sitting in said seating;

each of said rear wheels being functionally interconnected to said transversely mounted engine and transmission by a drive shaft which comprises two constant velocity universal joints;

the first of said fuel tanks being affixed to said frame below said seating, and the second being affixed to said frame between said seating and said means for allowing steering of said front wheel;

said storage compartment being present within said frame at a location between said seating and said front wheel;

said at least one taillight being mounted to said three-wheeled vehicle so as to be visible from in back of the rear wheels; and said dual back turn signals being mounted one to the left and one to the right of a centerline of said three-wheeled vehicle as viewed from in back of the rear wheels.

2. A three-wheeled vehicle as in claim 1 in which said frame provides a nominal 64.5 inch real wheel base, and a nominal 105 inches between said front and back wheels.

3. A three-wheeled vehicle as in claim 1 in which said first and second fuel tanks are each nominally 5 gallon tanks.

4. A three-wheeled vehicle as in claim 1 in which said first braking means for applying wheel rotation slowing force simultaneously to said two back wheels, is operated by a foot pedal which is located between said front wheel and said seating at a location convenient for operation by a user's foot when said user is sitting in said seating.

5. A three-wheeled vehicle as in claim 1 in which said second braking means for applying wheel rotation slowing force to said front wheel is hand operated by a lever operated means located on said means for allowing steering of said front wheel which is positioned at a location convenient for operation by a user's hand when said user is sitting in said seating.

6. A three-wheeled vehicle as in claim 1, in which said seating is appropriate for a single rider.

7. A three-wheeled vehicle as in claim 1, in which said seating is appropriate for at least two riders.

8. A three-wheeled vehicle as in claim 1, in which said frame, viewed with the rear end thereof positioned to the left and the forward end thereof positioned to the right, comprises:

left side (RT3) and right side (RT4) rear frame extension elements which each project substantially horizontally parallel to one another;

left side (RT1) and right side (RT2) rear frame top elements which each project downward and centrally;

said left side (RT3) rear frame extension element and said left side (RT1) rear frame top element being continuous;

said right side (RT4) rear frame extension element and said right side (RT2) rear frame top element being continuous;

the ends of said rearward left side (RT3) and right side (RT4) rear frame extension elements being interconnected by a top rear tie element (RT5), and said forward ends of said left side (RT1) and right side (RT2) rear frame top elements being interconnected by a lower frame tie (F4);

said frame further comprising left side (RB1) and right side (RB2) rear frame lower elements which project horizontally parallel to said left side (RT3) and right side (RT4) rear frame extension elements therebeneath, and then downward and centrally to connections with left side (RT1) and right side (RT2) rear frame top elements, respectively;

the rearward ends of left side (RB1) and right side (RB2) rear frame lower elements being interconnected by a lower frame tie (RB3), and the forward ends of left side (RB1) and right side (RB2) rear frame lower elements being interconnected by lower frame tie (F4), there being an additional seating support tie (C3) interconnecting said left side (RB1) and right side (RB2) rear frame lower elements between said lower frame tie (RB3) and said lower frame tie (F4);

there being a left side lower control arm flange (LCA1) and a right side lower control arm flange (LCA2) affixed to project downward from, respectively, the rearward ends of said left side (RB1) and right side (RB2) rear frame lower elements;

said left side (RT1) rear frame top element being interconnected to said left side (RB1) rear frame lower element by a left (C9) lower frame tie;

and right side (RT2) rear frame top elements and right side (RB2) rear frame lower element by a right (C10) lower frame tie;

said top rear tie element (RT5) being interconnected to lower frame tie (RB3) by substantially vertically projecting left (VR1) and right (VR2) rear vertical supports;

left (RB4) and right (RB5) lower radiator extensions being projected rearward and being connected to said substantially vertically projecting left (VR1) and right (VR2) rear vertical supports, with the latter connecting to lower frame tie (RB3) respectively;

rearward aspects of left (RB4) and right (RB5) lower radiator extensions being interconnected by lower radiator tie (RB6);

upper left (RT6) and right (RT8) radiator extensions being connected to said top rear tie element (RT5) and projecting rearward and being interconnected by upper radiator tie (RT7);

said lower radiator tie (RB6) and said upper radiator tie (RT7) being interconnected by substantially vertically projecting left (VR3) and right (VR4) vertical radiator ties;

said frame further comprising left (F1) and right (F2) lower front frame elements which connect to said left (RB1) and right (RB2) rear frame lower elements and project forward and first gradually upward and second substantially upward, and toward one another; and left (G4) and right (G5) lower head tube elements which also connect to said left (RB1) and right (RB2) rear frame lower elements and project forward and upward and converge to a common connection therebetween;

said left (F1) and right (F2) lower front frame elements being interconnected by a lower frame tie element (F3)

at the location where the gradual upward projection becomes a more substantially upward projection;

said left (F1) and right (F2) lower front frame elements being forwardly connected to said left (G4) and right (G5) lower head tube elements, respectively;

there being a head tube (G1) connected, at a lower end thereof, to said left (G4) and right (G5) lower head tube elements at their point of interconnection, said head tube (G1) being connected to left (G3) and right (G2) geeseneek head tube connectors at an upper end thereof, said left (G3) and right (G2) head tube connectors projecting generally downward to interconnections with left (G4) and right (G5) lower head tube elements, respectively;

said frame further comprising left (C2) and right (C1) center seating supports which project centrally and rearward and upward from interconnections to said left side (RT1) and right side (RT2) rear frame top elements;

said left (C2) and right (C1) center seating supports being rearwardly interconnected by horizontal set support (C6);

said left (C2) and right (C1) center seating supports being interconnected to seating support tie (C3) by substantially vertically projecting left (C5) and right (C4), respectively;

there being left (C7) and right (C8) fore to aft seating supports which project forward and gradually upward to interconnect to left (G4) and right (G5) lower head tube elements, respectively, with an upper (G6) connector tie being present between said left (C7) and right (C8) fore to aft seating supports;

said frame further comprising a lower left (GP2) gusset which interconnects convergent ends of left side (RT1) rear frame top element, left (C2) center seating support, left (G4) lower head tube element, left (F1) lower front frame element, and lower frame tie (F4);

left side (RT1) rear frame top element, left (C2) center seating support, left (G4) lower head tube element, left (F1) lower front frame element, and lower frame tie (F4);

and a lower right gusset (GP1) which interconnects convergent ends of right side (RT2) rear frame top element, right (C1) center seating support, right (G5) lower head tube element, right (F2) lower front frame element, and lower frame tie (F4);

said frame further comprising central lower gusset (GP5), lower left (GP4) and lower right gussets (GP3) which interconnect:

right (F2) lower front frame element and lower frame tie element (F3), left (F1) lower front frame element and lower left head tube element (G4), and right (F2) lower front frame element and right lower head tube element (G5), respectively;

said frame further comprising upper left (GP7) and upper right (GP6) gussets which interconnect:

left (G3) head tube connector and lower left (G4) neck element, and right (G2) head tube connector and right lower head tube element (G5), respectively.

* * * * *